US00RE48978E

(19) United States
(12) Reissued Patent
Stolz

(10) Patent Number: US RE48,978 E
(45) Date of Reissued Patent: Mar. 22, 2022

(54) DRAGLINE BUCKET

(71) Applicant: Caterpillar Inc., Peoria, IL (US)

(72) Inventor: Michael Robert Stolz, Franklin, WI (US)

(73) Assignee: Caterpillar Inc., Peoria, IL (US)

(21) Appl. No.: 17/133,063

(22) Filed: Dec. 23, 2020

Related U.S. Patent Documents

Reissue of:
(64) Patent No.: 10,544,562
Issued: Jan. 28, 2020
Appl. No.: 15/493,405
Filed: Apr. 21, 2017

(51) Int. Cl.
*E02F 3/60* (2006.01)
*E02F 3/48* (2006.01)

(52) U.S. Cl.
CPC . *E02F 3/60* (2013.01); *E02F 3/48* (2013.01)

(58) Field of Classification Search
CPC ..... E02F 3/48; E02F 3/60
USPC ..... 37/394, 398, 399, 444; 172/26.5
See application file for complete search history.

(56) References Cited

U.S. PATENT DOCUMENTS 774,431 A * 11/1904 Ireland ..... E02F 3/60 37/398
795,971 A * 8/1905 Hanaford ..... E03F 9/002 15/104.31
954,936 A * 4/1910 Crenshaw ..... E02F 3/60 37/396
1,154,357 A * 9/1915 West ..... E02F 3/60 37/398
1,430,075 A * 9/1922 Green ..... E02F 3/60 172/26.5
1,481,273 A * 1/1924 Roe ..... E02F 3/60 172/26.5
1,579,945 A * 4/1926 Kelly ..... E02F 3/60 37/396
1,753,022 A * 4/1930 Robbins ..... E02F 3/60 172/26.5
1,852,671 A * 4/1932 Page ..... E02F 3/60 37/398
1,879,447 A * 9/1932 Page ..... E02F 3/60 37/398
1,932,175 A * 10/1933 Green ..... E02F 3/60 172/26.5
1,979,738 A * 11/1934 Gibson ..... E02F 3/60 37/398

(Continued)

OTHER PUBLICATIONS

"Swedish Steel prize for SA tipper innovation", Publication: Mechanical Technology, dated Jan. 2011. 4 pages.

(Continued)

*Primary Examiner* — Russell D Stormer
(74) *Attorney, Agent, or Firm* — Haynes and Boone, LLP

(57) ABSTRACT

A dragline bucket comprises a base member, a first side member extending from the base member and including a first top edge, a second side member extending from the base member, and a rear member extending from the base member and including a second top edge, a mouth for receiving material into the bucket, and a first beveled wall extending from the first side member forming a first compound angle with the base member and a second beveled wall extending from the rear member proximate the first beveled wall forming a second compound angle with the base member.

24 Claims, 6 Drawing Sheets

AMENDED

(56) References Cited

U.S. PATENT DOCUMENTS

| | | | | | |
|---|---|---|---|---|---|
| 1,986,853 | A * | 1/1935 | Rauch | E02F 3/60 | 37/398 |
| 1,989,334 | A * | 1/1935 | Page | E02F 3/60 | 37/398 |
| 2,096,773 | A * | 10/1937 | Weimer | E02F 3/48 | 37/398 |
| 2,109,195 | A * | 2/1938 | Green | E02F 3/60 | 172/26.5 |
| 2,501,429 | A * | 3/1950 | Yaun | E02F 3/60 | 37/398 |
| 2,591,278 | A * | 4/1952 | Morgan | E02F 3/6463 | 37/444 |
| 2,669,042 | A * | 2/1954 | Swank | E02F 3/60 | 37/398 |
| 2,770,058 | A * | 11/1956 | Thompson | E02F 3/60 | 172/26.5 |
| 3,247,607 | A * | 4/1966 | Page | E02F 3/60 | 37/399 |
| 3,531,088 | A * | 9/1970 | Kraschnewski | E02F 3/48 | 254/292 |
| 3,915,238 | A * | 10/1975 | Hubbell | E02F 3/60 | 172/26.5 |
| 5,307,571 | A * | 5/1994 | Behlendorf | E02F 3/60 | 37/396 |
| 5,575,092 | A * | 11/1996 | Smit | E02F 3/60 | 37/398 |
| 5,752,334 | A * | 5/1998 | Immel | E02F 3/48 | 37/396 |
| 5,832,638 | A * | 11/1998 | Watts | E02F 3/60 | 37/396 |
| 6,834,449 | B2 * | 12/2004 | Leslie | E02F 3/60 | 37/398 |
| 7,472,502 | B2 * | 1/2009 | Gregory | B22D 17/22 | 37/397 |
| 7,774,959 | B2 * | 8/2010 | Kubo | E02F 3/60 | 37/195 |
| 8,572,870 | B2 | 11/2013 | Kudo et al. | | |
| 9,903,092 | B2 * | 2/2018 | Lunn | E02F 9/2883 | |
| 10,513,836 | B2 * | 12/2019 | Leslie | E02F 3/60 | |
| 10,544,562 | B2 * | 1/2020 | Stolz | E02F 3/48 | |
| 2010/0005689 | A1 * | 1/2010 | Leslie | E02F 3/40 | 37/444 |
| 2014/0305011 | A1 * | 10/2014 | Leslie | E02F 3/40 | 37/398 |
| 2015/0292177 | A1 * | 10/2015 | Leslie | E02F 3/40 | 37/444 |

OTHER PUBLICATIONS

Cory Dellenbach, "Giant Excavator Finds a Home in Texas", Dig Different, Jan. 2, 2015 URL: https://www.digdifferent.com/online_exclusives/2015/01/giant_excavator_finds_a_home_in_texas. 7 pages.

EDEM-MDB Coupling of Dragline Bucket using EDEM Simulation (Courtesy of VR Steel), https://www.youtube.com/watch?v=vb0ujdfl8Ao uploaded on Sep. 2015, 13 pages.

John Van Reenen, "Digging with Goliath", Bulk Handling Today, Apr. 2007, pp. 8-9.

VR Steel Dragline Bucket, photograph dated Mar. 9, 2017, 1 page.

VR Taper Bucket digging with 360 dump swing, https://www.youtube.com/watch?v=6KwrHSNKawA uploaded on Feb. 20, 2017, 20 pages.

VR Taper Bucket in free-dig operation, https://www.youtube.com/watch?v=Cug_rinlya0 uploaded on Sep. 14, 2016, 16 pages.

* cited by examiner

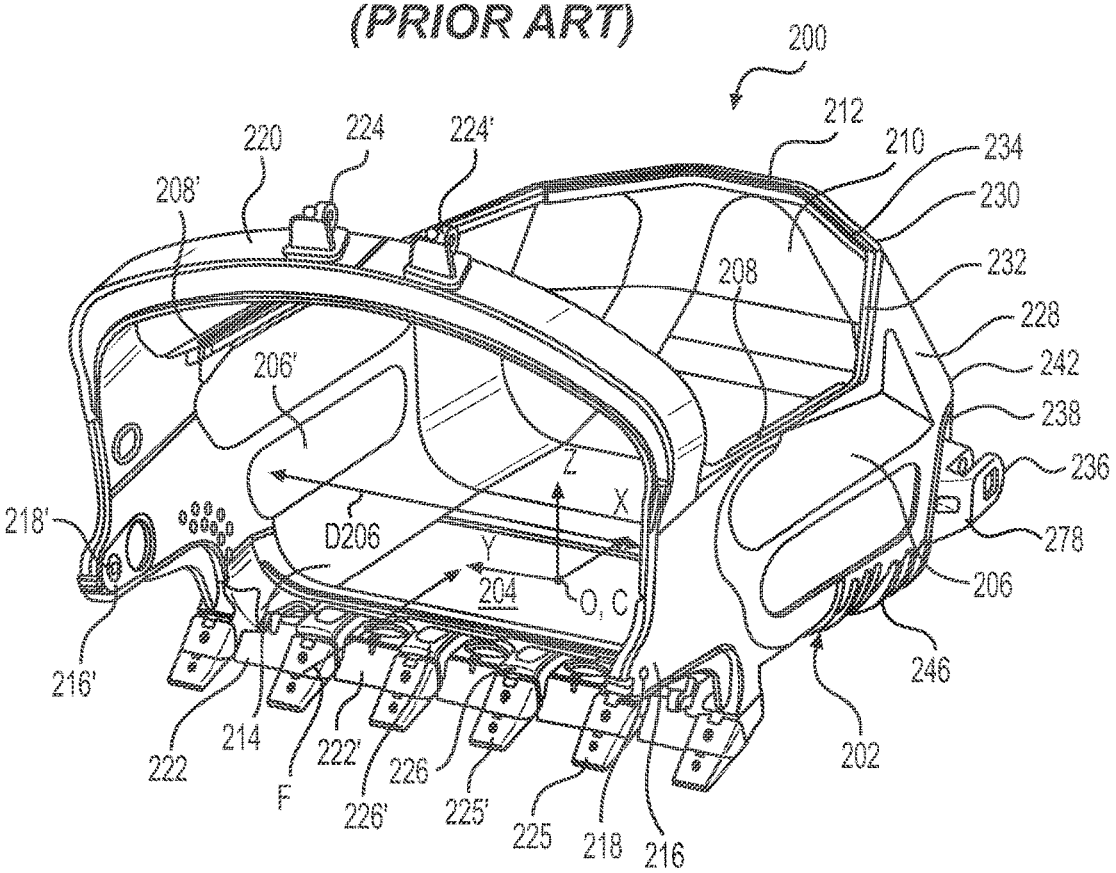
FIG. 2
AMENDED

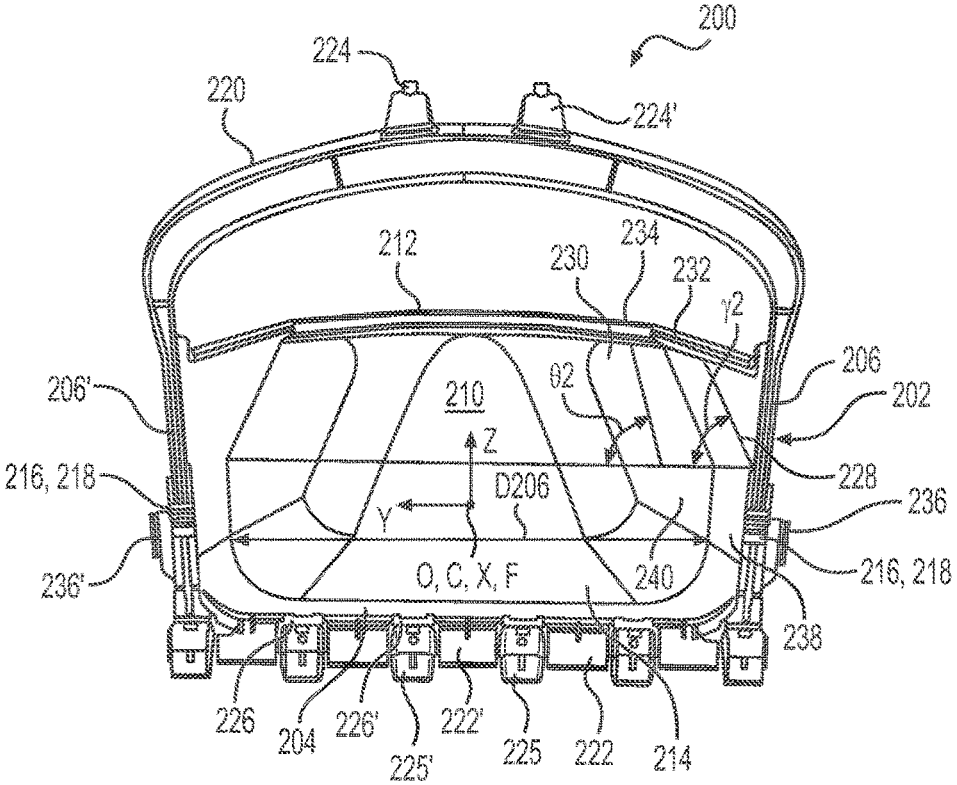
FIG. 3
AMENDED
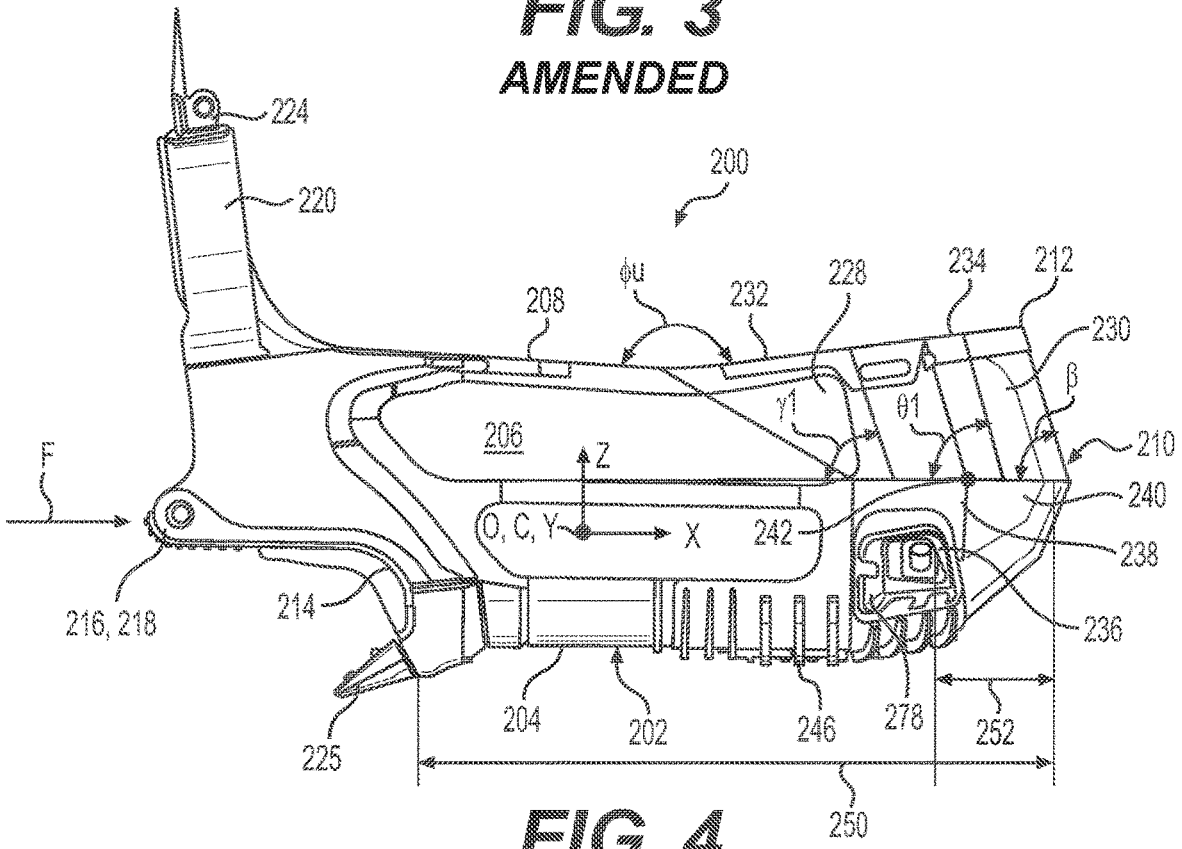
FIG. 4
AMENDED

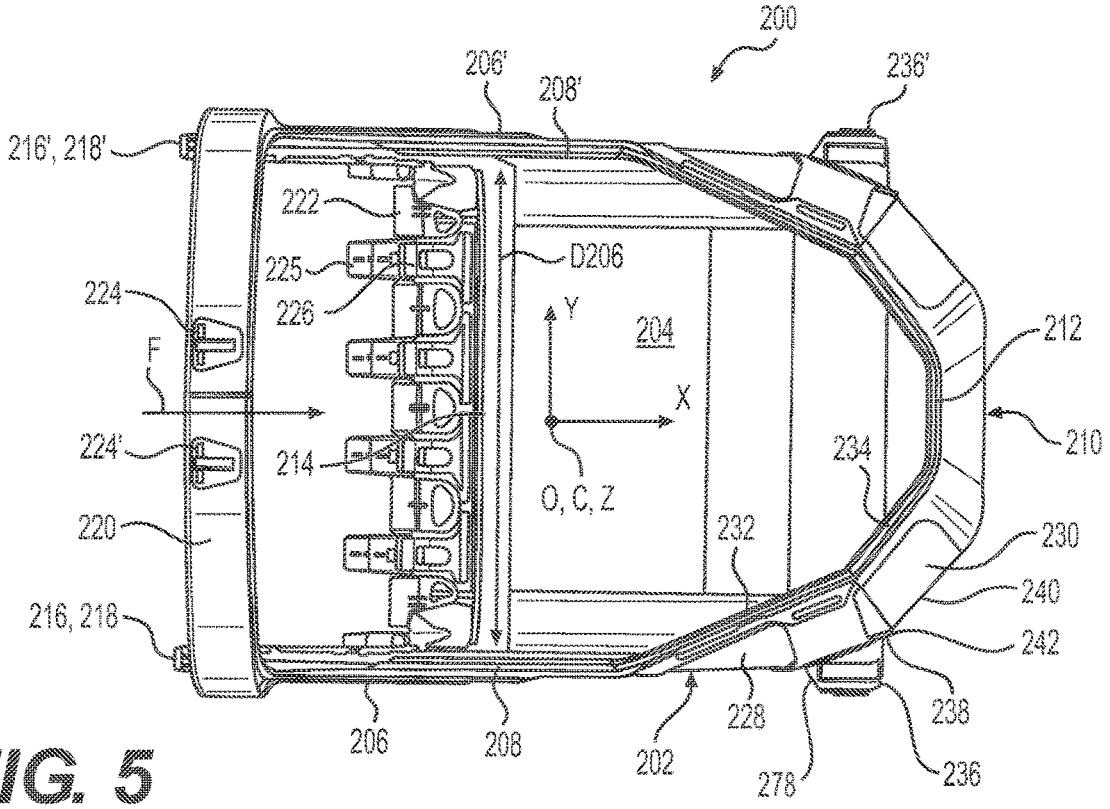
FIG. 5
AMENDED
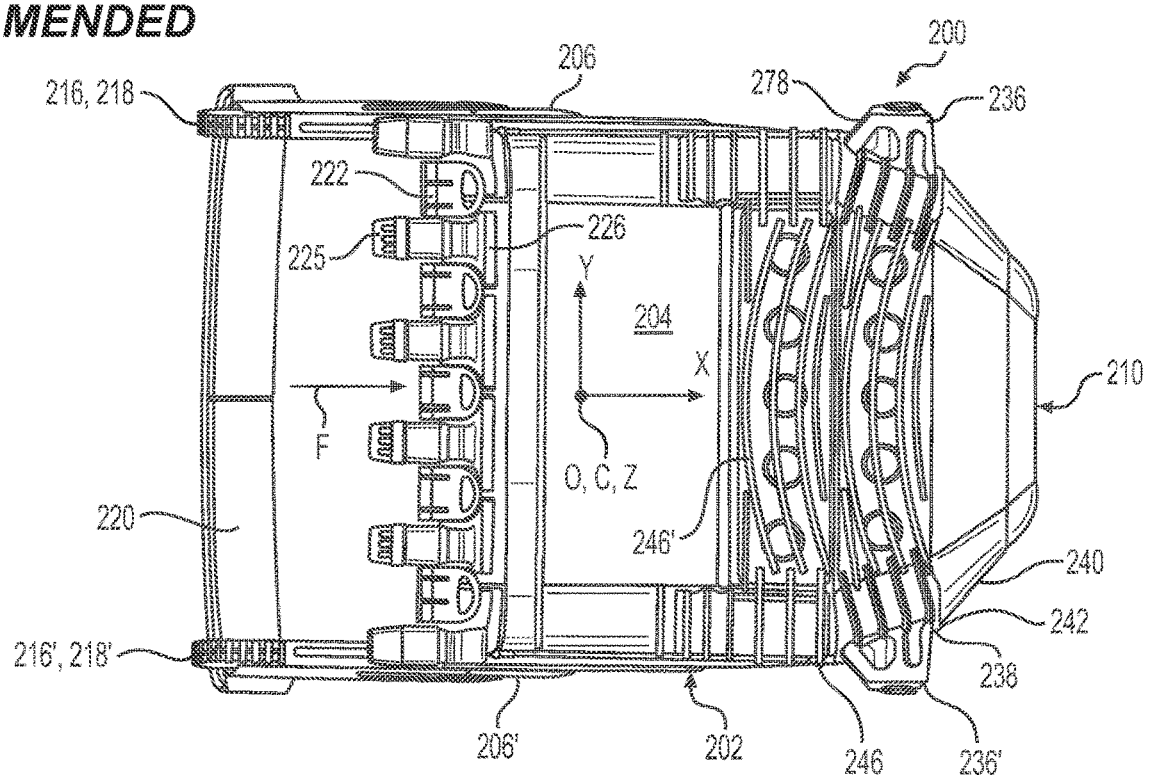
FIG. 6
AMENDED

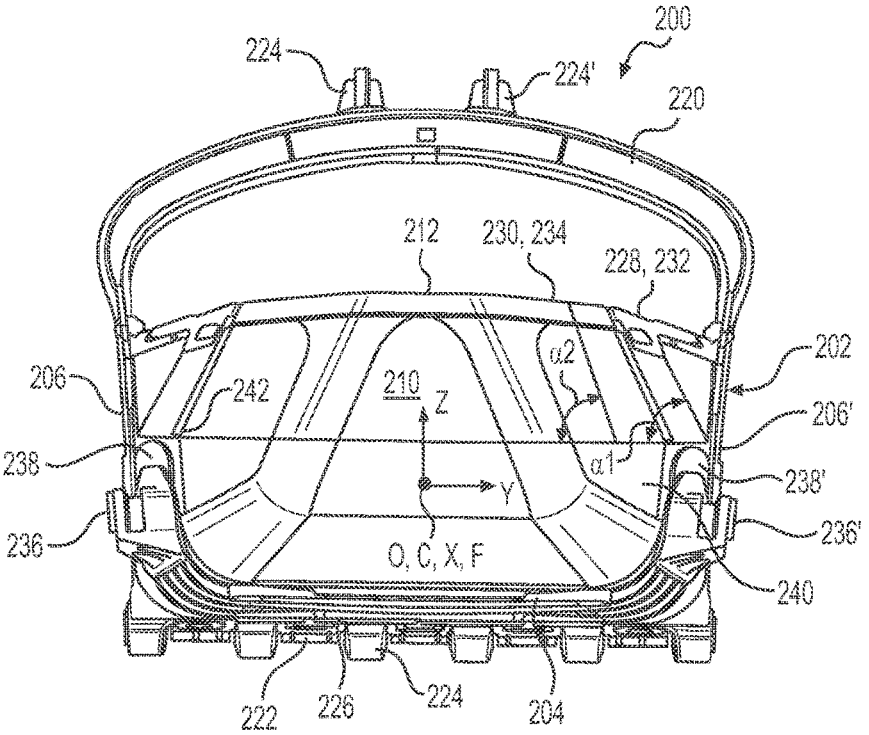
FIG. 7
AMENDED
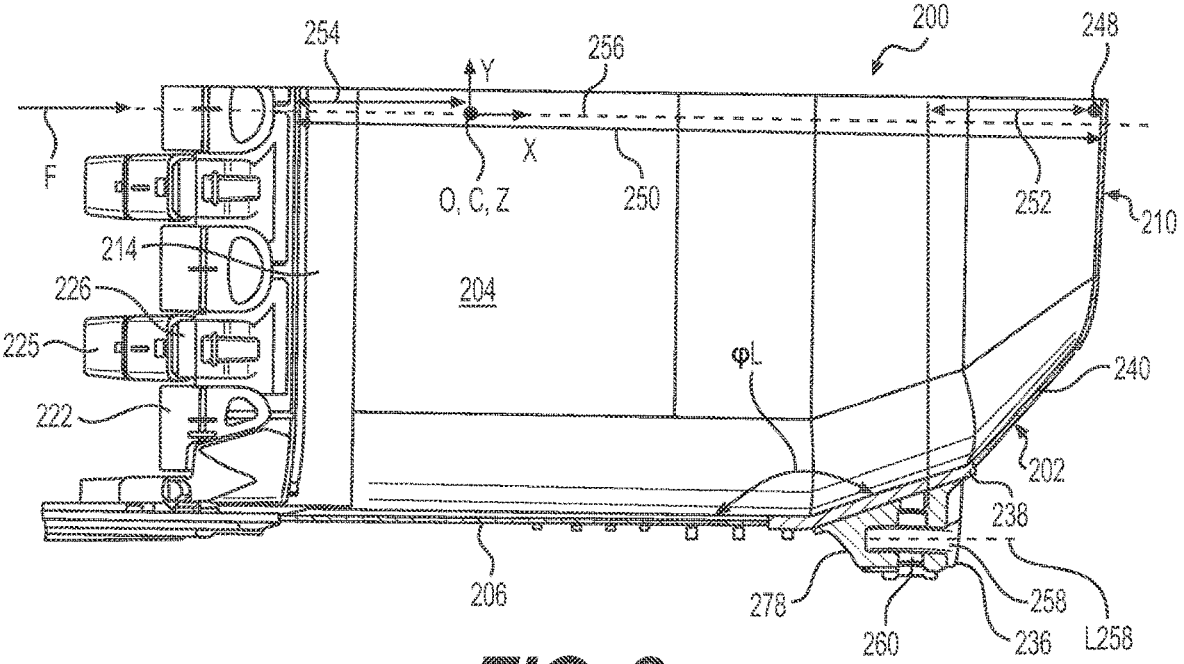
FIG. 8
AMENDED

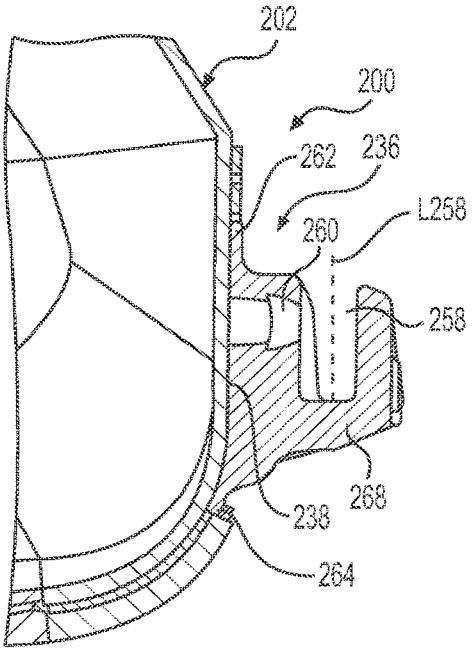
FIG. 13
AMENDED
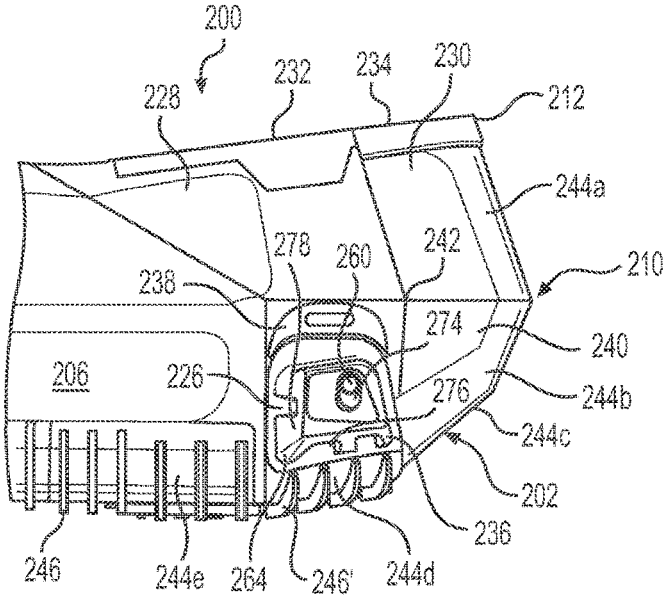
FIG. 14
AMENDED

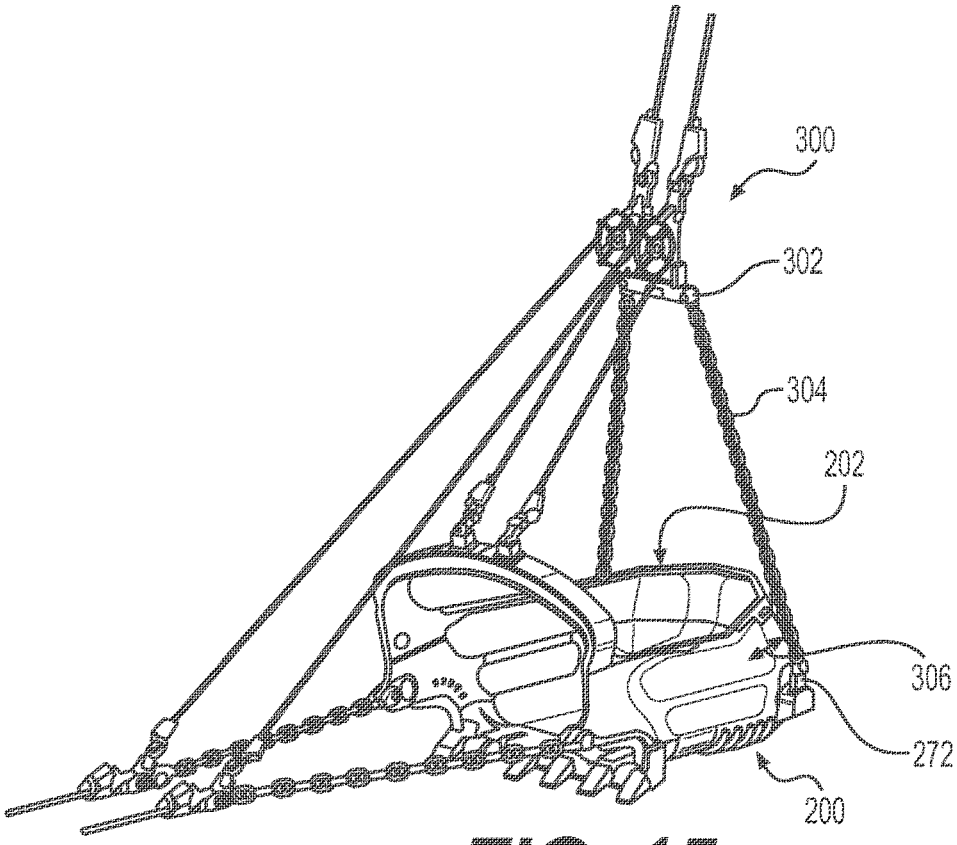
FIG. 15 AMENDED
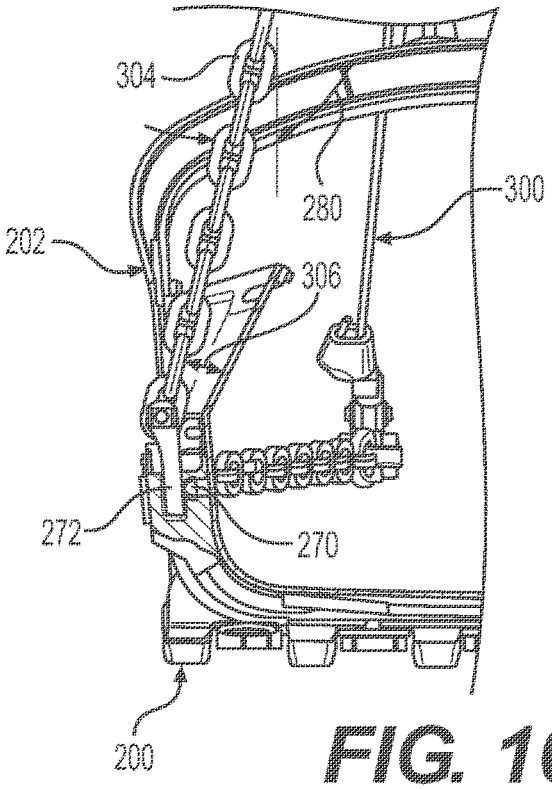
FIG. 16
AMENDED

DRAGLINE BUCKET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATION*

*This application is a Broadening Reissue application of U.S. Pat. No. 10,544,562 which issued on Jan. 28, 2020 from U.S. patent application Ser. No. 15/493,405 filed Apr. 21, 2017, the contents of which are incorporated herein by reference in their entirety.*

TECHNICAL FIELD

The present disclosure relates to bucket and rigging assemblies that are used in dragline mining operations and the like. More specifically, the present disclosure relates to a dragline bucket assembly that includes beveled walls near the rear of the bucket assembly.

BACKGROUND

Referring initially to FIG. 1, bucket assemblies 100 have been traditionally used with rigging assemblies 102 that use a lower spreader bar 104 positioned above the rear attachment points 106 (usually trunnion type connections with trunnion links are provided) of the bucket assembly 100 to help keep the hoist chains 108, from which the bucket assembly 100 is suspended, from contacting the edges 110 of the walls such as the sidewalls 112 of the bucket assembly 100 during use such as when material is loaded into or dumped out of the bucket 114. If such contact or rubbing occurs as the pulling chains 116 (shown to be attached via a clevis link) make the bucket move, the chains 108 may wear over time and need replacement, requiring downtime for maintenance that could lead to loss profits for a mining operation or the like. Also, the spreader bar 104 helps to position the chains 108 so that the chains do not inhibit the filling of the bucket 114 or dumping of the bucket 114.

However, such spreader bars 104 are very heavy, putting a load on the hoist chains 108 and on the machine (not shown) using the bucket assembly 100, and may themselves wear. This too can lead to required maintenance. Also, the machine may have to exert more energy, resulting in higher operation costs for the mining operation or the like. Furthermore, the weight of the spreader bar 104 limits the capacity of the bucket 114, affecting the efficiency of the mining operation.

Consequently, various designs have been developed to eliminate the need for a lower spreader bar 104. One such design has included altering the geometry of the rear of the bucket 114, such as by angling, beveling or mitering the sidewall 112 as desired near the rear of the bucket 114, to decrease the risk of the chain 108 at a rear attachment point 106 of the bucket 114 from rubbing on an edge 110 of the bucket 114. However, these buckets 114 tend to be long, rendering them less efficient than desirable when loading the bucket 114 with material in use (e.g. it may take longer to fill or empty such buckets). Also, the placement of the attachment points 106 do not maintain balance of the bucket 114 as material is loaded into the bucket in a desirable manner. Another design has placed the attachment points 106 or trunnions inside of the bucket 114, but this tends to limit or interfere with the loading or dumping of material into or out of the bucket 114. In other cases, the trunnions are placed on the rear wall but this may not be ideal in terms of maintaining balance of the bucket as material is loaded into the bucket.

Accordingly, it is desirable to develop a better design for a dragline bucket to help eliminate the need for a spreader bar in the rigging assembly than has yet been devised.

SUMMARY OF THE DISCLOSURE

A dragline bucket according to an embodiment of the present disclosure comprises a base member, a first side member extending from the base member and including a first top edge, a second side member extending from the base member in an opposing manner to the first side member defining a distance from the first side member to the second side member, and a rear member extending from the base member and including a second top edge. The first side member, second side member and base member define a mouth for receiving material into the bucket, and a first beveled wall extends from the first side member and a second beveled wall extends from the rear member proximate the first beveled wall. The first beveled wall forms a first compound angle with the base member and the second beveled wall forms a second compound angle with the base member that is different than the first compound angle.

A dragline bucket according to an embodiment of the present disclosure comprises a base member, a first side member extending from the base member and including a first top edge, a second side member extending from the base member in an opposing manner to the first side member defining a distance from the first side member to the second side member, and a rear member extending from the base member and including a second top edge. The first side member, second side member and base member define a mouth for receiving material into the bucket, and a first beveled wall extends from the first side member and a first mitered wall extends from the first side member proximate the first beveled wall, the first beveled wall forming a first compound angle with the base member and the first mitered wall forming a lower obtuse angle with the first side member.

A dragline bucket according to an embodiment of the present disclosure comprises a base member, a first side member extending from the base member and including a first top edge, a second side member extending from the base member in an opposing manner to the first side member defining a distance from the first side member to the second side member, and a rear member extending from the base member and including a second top edge. The first side member, second side member and base member define a mouth for receiving material into the bucket, the rear member defines a rear internal extremity of the bucket, and the bucket defines a fill direction and a center of gravity and a Cartesian coordinate system including a X-axis, Y-axis, a Z-axis and an origin positioned at the center of gravity, wherein the X-axis is aligned with the fill direction of the bucket, the bucket further defines a fill depth parallel to the X-axis measured from the mouth to the rear internal extremity of the rear member. A first trunnion attachment structure is attached to the bucket a first predetermined distance away from the rear internal extremity along the X-axis, and a ratio of the first predetermined distance to the fill depth ranges from 15 to 45%.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 2 is a perspective view of a bucket assembly according to [an embodiment] *embodiments* of the present disclosure that includes a plurality of beveled or mitered walls near the rear of the bucket.

FIG. 3 is a front view of the bucket assembly of FIG. 2.

FIG. 4 is side view of the bucket assembly of FIG. 2.

FIG. 5 is a top view of the bucket assembly of FIG. 2.

FIG. 6 is a bottom view of the bucket assembly of FIG. 2.

FIG. 7 is a rear view of the bucket assembly of FIG. 2.

FIG. 8 is a top sectional view of half of the bucket assembly of FIG. 4, the section taken along the horizontal plane of the pin slot.

FIG. 13 is an enlarged section view of the trunnion attachment structure shown in FIG. 8 taken at a lower level than the section of FIG. 8.

FIG. 14 is an enlarged view of the trunnion attachment structure shown in FIG. 4.

FIG. 15 illustrates the bucket assembly of FIG. 2 used with a rigging assembly lacking a lower spreader bar.

FIG. 16 is a rear sectional view of the bucket and rigging assemblies of FIG. 15, with the bucket and rigging assemblies cut in half along the midplane of the assemblies.

DETAILED DESCRIPTION

Figure 1:
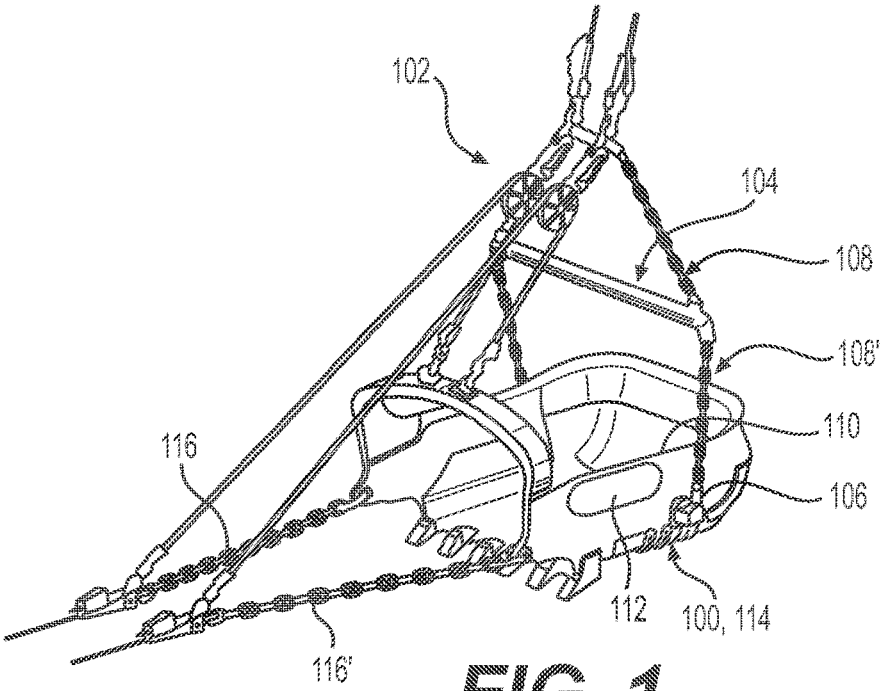
FIG. 1 (PRIOR ART)
FIG. 1 is a perspective view of a dragline bucket that is suspended using hoist chains attached to a lower spreader bar in the rigging assembly as is known in the art.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

In various embodiments, a bucket assembly or bucket that uses a plurality of beveled walls that reduce the likelihood of a hoist chain rubbing on an edge of the bucket is provided while also lessening the likelihood that a void will form in the rear of the bucket when the bucket is loaded with material. In other embodiments, a bucket assembly or bucket is that uses a beveled wall to reduce the likelihood of a hoist chain rubbing on an edge of the bucket is provided along with a mitered wall located beneath the beveled wall where the trunnion attachment structure is disposed, helping to protect the trunnion attachment structure from wear as material passes over the trunnion attachment structure as the bucket is loaded. In yet further embodiments, the trunnion attachment structure is positioned from the rear wall and from the center of gravity appropriate distances to maintain the desired balance as the bucket is filled with material.

Looking now at FIGS. 2 thru 8, a bucket assembly 200 according to an embodiment of the present disclosure will now be described that may allow the elimination of a lower spreader bar while also improving the ability to fill the rear of the bucket 202. The bucket assembly 200 may comprise a bucket 202 including a base member 204, a first side member 206 including a first top edge 208 extending from the base member 204, a second side member 206' extending from the base member 204 in an opposing manner to the first side member 206 defining a distance D206 from the first side member 206 to the second side member 206', and a rear member 210 including a second top edge 212 extending from the base member 204. The first side member 206, second side member 206' and base member 204 define a front ring or mouth 214 for receiving material into the bucket 202. For this embodiment, the first and second side members 206, 206' extend forward of the mouth 214, defining forward facing projections 216 (sometimes referred to as drag lugs) that provide clevis pin compatible attachment points 218 and an arch 220 that extends from the frontmost portion of top edges 208, 208' of the first and second side members 206, 206'. Two arch attachment points 224 are provided at the top of the arch 220. Other configurations for the first and second side members are possible. Also, the arch may be omitted or a bail may be provided, etc.

The front edge of the base member 204 is covered or protected by various devices such as edge protectors 222 (sometimes referred to as shrouds) and ground engaging tools 225. The ground engaging tools 225 are attached to the front edge using tool adapters 226. In other embodiments, a continuous edge protector or base edge may be attached to the front edge of the base member 204. In yet further embodiments, any form of front edge protection may be omitted.

Looking toward the rear of the bucket 202, a first beveled wall 228 may extend from the first side member 206 and a second beveled wall 230 may extend from the rear member 210 proximate the first beveled wall 228. The first beveled wall 228 forms a first compound angle $\alpha 1$ (best seen in FIG. 7) with the base member 204 and the second beveled wall 230 forms a second compound angle $\alpha 2$ (best seen in FIG. 7) with the base member 204 that is different than the first compound angle $\alpha 1$. The change in angle between the first compound angle $\alpha 1$ and the second compound angle $\alpha 2$ allows the bucket to transition from the first side member 206 to the rear member 210 while also providing the first beveled wall 228 with a first function and providing the second beveled wall 230 with a second function. The first function of the first beveled wall 228 is to decrease the likelihood of a hoist chain rubbing on a top edge 208 of the bucket 202 while the function of the second beveled wall 230 is to decrease the likelihood of a void being created as material fills into the corner of the rear of the bucket 202.

More specifically, the first beveled wall 228 includes a third top edge 232 connected to the first top edge 208 of the first side member 206 and the second beveled wall 230 includes a fourth top edge 234 connected to the second top edge 212 of the rear member 210. Also, the first beveled wall 228 may be connected to the second beveled wall 230 such that the third top edge 232 of the first beveled wall 228 is connected directly to the fourth top edge 234 of the second beveled wall 230. At least a portion of the rear member 210 forms a third angle β (best seen in FIG. 4) with the base member 204. The angles of the rear member, first beveled wall and second beveled walls allow these portions of the bucket to overhang the interior of the bucket, making it less likely that material will fall out of the bucket as material is loaded into the bucket.

The bucket 202 defines a fill direction F and a center of gravity C and a Cartesian coordinate system including a X-axis, Y-axis, a Z-axis and an origin O positioned at the center of gravity C. As shown in FIGS. 2 thru 8, the X-axis is aligned with the fill direction F of the bucket 202, and the first compound angle α1 includes a first component angle γ1 (best seen in FIG. 4) projected along the Y-axis onto the X-Z plane and a second component angle γ2 (best seen in FIG. 3) projected along the X-axis onto the Y-Z plane, and the first component angle γ1 ranges from 50 to 85 degrees and the second component angle γ2 ranges from 50 to 80 degrees.

Similarly, the second compound angle α2 includes a third component angle θ1 (best seen in FIG. 4) projected along the Y-axis onto the X-Z plane and a fourth component angle θ2 (best seen in FIG. 3) projected along the X-axis onto the Y-Z plane, and the third component angle θ1 ranges from 60 to 80 degrees and the fourth component angle θ2 ranges from 50 to 85 degrees. Also, the third angle β (best seen in FIG. 4) the rear member 210 forms with the base member 204 is projected onto the X-Z plane along the Y-axis and ranges from 60 to 80 degrees and may be approximately 70 degrees in some embodiments.

[With continued reference to FIGS. 2 thru 8, a] *In one or more other embodiments, a lower spreader bar may be eliminated while also protecting a rear trunnion attachment structure 236 of* bucket assembly [200' according to an embodiment of the present disclosure will now be described that may allow the elimination of a lower spreader bar while also protecting a rear trunnion attachment structure 236 of the bucket] *200.* [The] *In such embodiment, the* bucket [202'] *202* may include a base member 204, a first side member 206 including a first top edge 208 extending from the base member 204, a second side member 206' extending from the base member 204 in an opposing manner to the first side member 206 defining a distance D206 from the first side member 206 to the second side member 206', and a rear member 210 including a second top edge 212 extending from the base member 204 as previously described. Also, the first side member 206, second side member 206' and base member 204 define a mouth 214 for receiving material into the bucket 202.

A first beveled wall 228 extends from the first side member 206 and a first mitered wall 238 extends from the first side member 206 proximate the first beveled wall 228, the first beveled wall 228 forming a first compound angle α1 with the base member 204 and the first mitered wall 238 forming a lower obtuse angle φL (best seen in FIG. 8) with the first side member 206. The rear trunnion attachment structure 236 extends at least partially from the first mitered wall 238.

As previously described, the bucket defines a fill direction F and a center of gravity C and a Cartesian coordinate system including a X-axis, Y-axis, a Z-axis and an origin O positioned at the center of gravity C. [The] *In one or more embodiments, the* X-axis is aligned with the fill direction F of the bucket [202'] *202*, and the first compound angle α1 includes a first component angle γ1 (best seen in FIG. 4) projected along the Y-axis onto the X-Z plane and a second component angle γ2 (best seen in FIG. 3) projected along the X-axis onto the Y-Z plane, and the first component angle γ1 ranges from 50 to 85 degrees and the second component angle γ2 ranges from 60 to 80 degrees. The lower obtuse angle φL (best seen in FIG. 8) is projected onto the X-Y plane along the Z-axis and the lower obtuse angle φL ranges from 150 to 170 degrees and may be approximately 160 degrees in some embodiments.

[The] *In one or more embodiments, the* bucket [202'] *202* may further comprise a second beveled wall 230 connecting the first beveled wall 228 to the rear member 210 and a second mitered wall 240 connecting the first mitered 238 wall to the rear member 210. As best seen in FIG. 14, the first beveled wall 228, the second beveled wall 230, the first mitered wall 238 and the second mitered wall 240 may all be positioned immediately adjacent each other, forming a four way intersection 242. In addition, transitional walls [244 such as radii] *244a, 244b* may be used to connect the second beveled wall 230 and the second mitered wall 240, *respectively,* to the rear member 210. The transitional walls [244] *244c, 22d, 244e* may continue from the rear to the bottom of the bucket [202'] *202*, blending the first mitered wall 238 and the first side member 206 to the base member. Ribs 246 may be provided on the bottom of the base member 204 (*see FIG. 8*) and the bottom transitional walls [244] *244e, 244d*. The bucket may be symmetrical about the X-Z plane. The third and fourth top edges 232, 234 may be coplanar with the second top edge 212.

As can be understood with reference to FIG. 8, another lower obtuse angle (not specifically pointed out) may be formed between the second mitered wall 240 and the rear member 210 that is projected along the Z-axis onto the X-Y plane that ranges from 130 to 150 degrees and may be approximately 140 degrees in some embodiments. The second mitered wall may also serve the purpose of helping to prevent the formation of a void in the rear corner of the bucket as it fills. The side member and the rear member may be substantially perpendicular to each other.

Next, referring back to FIGS. 2 thru 8, [the] *in one or more embodiments,* a bucket assembly [200" according to an embodiment of the present disclosure will now be described that provides] *200 may further provide* good balance as the bucket [202"] *202* is filled. [The] *In such embodiments,* bucket [200"] *200* comprises a base member 204, a first side member 206 extending from the base member 204 and including a first top edge 208, a second side member 206' extending from the base member 204 in an opposing manner to the first side member 206 defining a distance D206 from the first side member 206 to the second side member 206', and a rear member 210 extending from the base member 204 and including a second top edge 212.

As shown in FIG. 8, the first side member 206, second side member 206' and base member 204 define a mouth 214 for receiving material into the bucket [202"] *202*. The rear member 210 defines rear internal extremity 248 of the bucket, and the bucket [202"] *202* defines a fill direction F and a center of gravity C and a Cartesian coordinate system including a X-axis, Y-axis, a Z-axis and an origin O positioned at the center of gravity C. The X-axis is aligned with the fill direction F of the bucket [202"] *202*, and the bucket further defines a fill depth 250 parallel to the X-axis measured from the mouth 214 to the rear internal extremity 248 of the rear member 210. A first trunnion attachment structure 236 is attached to the bucket [202"] *202* a first predetermined distance 252 away from the rear internal extremity 248 (measured from the pin aperture 260 of 236), and a ratio of the first predetermined distance 252 to the fill depth 250 ranges from 15 to 45% and may be approximately 35% in some embodiments.

Likewise, the center of gravity is positioned a second predetermined distance 254 away from the mouth 214 along the X-axis and a ratio of the second predetermined distance 254 to the fill depth 250 ranges from 15 to 35% and may be approximately 20% in some embodiments. The X-Z plane defines a midplane 256 (sometimes also a plane of symmetry) and the trunnion attachment structure 236 defines a trunnion slot 258 with a longitudinal axis L258 that is parallel to the X-Z plane.

As mentioned earlier with reference to FIGS. 2 thru 8, a first beveled wall 228 extends from the first side member 206 toward the rear member 210 and the first trunnion attachment structure 236 is disposed beneath the first beveled wall 228 along a direction parallel with the Z-axis. A first mitered wall 238 extends from the first side member 206 toward the rear member 210, the first mitered wall 238 being connected to the first beveled wall 228 and the first trunnion attachment structure 236 is disposed on the first mitered wall 238.

Furthermore, as depicted in FIG. 4, a second beveled wall 230 extends from the first beveled wall 228 to the rear member 210. The first beveled wall 228 includes a third top edge 232 forming an upper obtuse angle φU with the first top edge 208 of the first side member 206 that is projected onto the X-Z plane along the Y-axis. The upper obtuse angle φU may range from 160 to 180 degrees and may be approximately 170 degrees.

Figure 9:
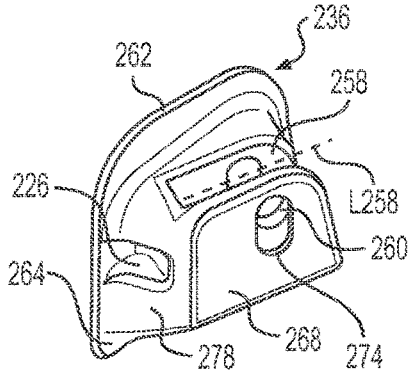
FIGS. 9 thru 12 are various perspective views of the trunnion attachment structure employed as part of the rear attachment points of the bucket assembly of FIGS. 2 thru 8.
Figure 10:
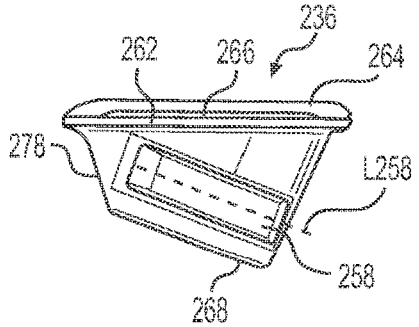
Figure 11:
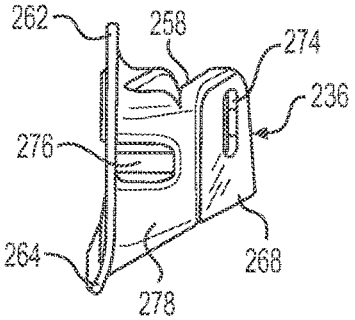
Figure 12:
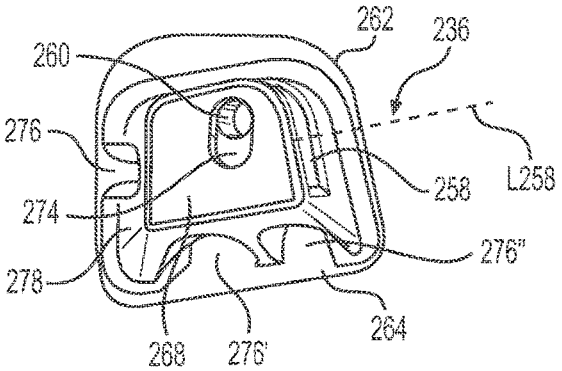

Turning now to FIGS. 8, and 9 thru 14, the construction and use of the trunnion attachment structure 236 will now be described in more detail. The trunnion attachment structure 236 includes an attachment or base plate 262 that is predominantly flat so that it may be attached to the first mitered wall 238. However, the bottom portion 264 of the base plate 262 may be curved to match a transition wall [244] *244d*. The trunnion attachment structure 236 as shown is particularly well suited to be cast. The back side of the trunnion attachment structure 236 may be hollowed or cored out (see reference numeral 266) and a pad 268 may extend from the base plate 262.

The pad 268 defines the trunnion slot and the pin aperture extends orthogonally to the trunnion slot 258 for receipt of a pin 270 (vaguely shown in FIGS. 15 and 16) that retains the trunnion link 272 (vaguely shown in FIGS. 15 and 16) in the slot 258 in a manner known in the art. An elongated access aperture 274 is also provided so that the pin 270 used to hold the trunnion link 272 in place may be accessed to attach and detach the trunnion link 272 from the trunnion attachment structure 236. Side grooves 276 are provided on the pad 268 to maintain the nominal wall thickness of the part. The pad 268 further defines a chamfered surface 278 that is positioned toward the front of the trunnion attachment structure 236 so that material flowing past the outside of the bucket 202 may be deflected by this chamfered surface 278, reducing the wear on the trunnion attachment structure 236. The orientation of the first mitered wall 238 and the attachment of the trunnion attachment structure 236 to this wall allows the trunnion attachment structure 236 to be partially shielded from material as it flows past the bucket 202 (see FIG. 3 for example).

The bucket, trunnion attachment structure, etc. may be made from any suitable material including iron, grey cast-iron, steel, etc. Also, the bucket, trunnion attachment structure, etc. may be integrally cast, forged or may be fabricated and assembled by fastening, welding, press fitting, etc. two or more pieces together to form the bucket, bucket assembly, or the trunnion attachment structure.

Any of the dimensions, ratios, angles or configuration of the bucket, trunnion attachment structure, etc. may be varied as needed or desired. Also, the dimensions and ratios involving the center of gravity may be based on the bucket as empty or with a payload depending on the application. Accordingly, values given and configurations shown are given by way of an example and not in any limiting sense.

INDUSTRIAL APPLICABILITY

In practice, a bucket, bucket assembly or trunnion attachment structure according to any embodiment described, shown or discussed herein may be sold, bought, manufactured, remanufactured, retrofitted, assembled or otherwise obtained in an aftermarket or OEM context.

For example, a trunnion attachment structure or bucket may be used as a replacement part. The bucket or bucket assembly may be used with a machine that has a rigging subassembly 300 such as that shown in FIGS. 15 and 16. The rigging assembly 300 as shown has no lower spreader bar but an upper spreader bar 302 is still employed. The upper spreader bar 302 is in the same plane as the hoist chain 304 and the trunnion link 272, helping to avoid twisting of the hoist chain 304, which may lead to increased stresses in the chain. Also, the hoist chain 304 is spaced away from the first beveled wall 228, creating clearance 306 so that the hoist chain 304 will not rub on the top edge of 232 the first beveled wall 228. Hence, no lower spreader bar is necessary. When the bucket is essentially horizontal, the hoist chain 304 makes an angle with the vertical direction (Z-axis as defined in FIGS. 2 thru 8, when projected onto the X-Z plane along the Y axis) that may range from 0 to 20 degrees and may be approximately 10 degrees in some embodiments. Similarly, the angle 280 the hoist chain makes with the vertical direction when projected onto the Y-Z plane along the X-direction may range from 10 to 45 degrees (see FIG. 16). These angles will change depending on the orientation of the bucket in use 202. The angle of attack or carry angle (bucket tilt), which is the angle the base member makes with a purely horizontal direction may vary from 0 to 40 degrees in some applications.

The configuration of the bucket shown in the figures is shorter along the fill direction, allowing a more efficient filling and dumping process to be used when employing the bucket. Also, the balance of the bucket during fill and dumping may be better than buckets previously known in the art. Furthermore, the capacity of the bucket may be increased compared to previous bucket designs, given the reduction of the load due to the elimination of the lower spreader bar.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A dragline bucket comprising:

a base member *extending along an X-axis*, a first side member extending from the base member and including a first top edge, a second side member extending from the base member [in an opposing manner to the first side member defining a distance from the first side member to the second side member], and a rear member extending from the base member and including a second top edge;

wherein the first side member, second side member and base member define a mouth for receiving material into the bucket; and a first beveled wall extending from the first side member and a second beveled wall extending from the rear member [proximate] *to intersect* the first beveled wall *and form an obtuse angle between the first beveled wall and the second beveled wall*, [the first beveled wall forming a first compound angle with the base member and the second beveled wall forming a second compound angle with the base member that is different than the first compound angle such that] *wherein* the first beveled wall and the second beveled wall *join together and each angle inward towards the X-axis to* overhang the base member.

2. The dragline bucket of claim 1, wherein the first beveled wall includes a third top edge connected to the first top edge of the first side member and the second beveled wall includes a fourth top edge connected to the second top edge of the rear member.

3. The dragline bucket of claim 2, wherein the first beveled wall is connected to the second beveled wall, and the third top edge of the first beveled wall is connected to the fourth top edge of the second beveled wall.

4. The dragline bucket of claim [2] *1*, [wherein at least a portion of the rear member forms a third angle with] *further comprising a trunnion attachment structure mounted on a trunnion attachment wall extending between the first beveled wall and* the base member.

5. The dragline bucket of claim 1, wherein the bucket defines a fill direction and a center of gravity and a Cartesian coordinate system including [a] *the* X-axis, *a* Y-axis, [a] *the* Z-axis and an origin positioned at the center of gravity, wherein the X-axis is aligned with the fill direction of the bucket, and the *first beveled wall forms a* first compound angle [includes] *with the base member, the first compound angle including* a first component angle projected along the Y-axis onto the X-Z plane and a second component angle projected along the X-axis onto the Y-Z plane, and the first component angle ranges from 50 to 85 degrees and the second component angle ranges from 50 to 80 degrees.

6. The dragline bucket of claim 5, wherein the *second beveled wall forms a* second compound angle [includes] *with the base member, the second compound angle including* a third component angle projected along the Y-axis onto the X-Z plane and a fourth component angle projected along the X-axis onto the Y-Z plane, and the third component angle ranges from 60 to 80 degrees and the fourth component angle ranges from 50 to 85 degrees.

7. The dragline bucket of claim 4, wherein the bucket defines a fill direction and a center of gravity and a Cartesian coordinate system including [a] *the* X-axis, *a* Y-axis, a Z-axis and an origin positioned at the center of gravity, wherein the X-axis is aligned with the fill direction of the bucket, and the third angle the rear member forms with the base member is projected onto the X-Z plane along the Y-axis and ranges from 60 to 80 degrees.

8. A dragline bucket comprising:

a base member *extending along an X-axis*, a first side member extending from the base member and including a first top edge, a second side member extending from the base member [in an opposing manner to the first side member defining a distance from the first side member to the second side member], and a rear member extending from the base member and including a second top edge;

wherein the first side member, second side member and base member define a mouth for receiving material into the bucket; and a first beveled wall extending from the first side member and a first mitered wall extending from the first side member [proximate] *below the first beveled wall and between* the first beveled wall *and the base member*, [the first beveled wall forming a first compound angle with the base member such that] *wherein* the first beveled wall overhangs the base member and the first mitered wall [forming a lower obtuse angle with the first side] *angles outward and away from the base* member.

9. The dragline bucket of claim 8 further comprising a trunnion attachment structure [extending at least partially from] *mounted below the first beveled wall on* the first mitered wall.

10. The dragline bucket of claim 8, wherein the bucket defines a fill direction and a center of gravity and a Cartesian coordinate system including [a] *the* X-axis, *a* Y-axis, a Z-axis and an origin positioned at the center of gravity, wherein the X-axis is aligned with the fill direction of the bucket, and the *first beveled wall forms a* first compound angle [includes] *with the base member, the first compound angle including* a first component angle projected along the Y-axis onto the X-Z plane and a second component angle projected along the X-axis onto the Y-Z plane, and the first component angle ranges from 50 to 85 degrees and the second component angle ranges from 50 to 80 degrees.

11. The dragline bucket of claim 10, wherein [the bucket defines a fill direction and a center of gravity and a Cartesian coordinate system including a X-axis, Y-axis, a Z-axis and an origin positioned at the center of gravity, wherein the X-axis is aligned with the fill direction of the bucket, and] the lower obtuse angle is projected onto the X-Y plane along the Z-axis and the lower obtuse angle ranges from 150 to 170 degrees.

12. The dragline bucket of claim of claim 11, further comprising a second beveled wall connecting the first beveled wall to the rear member.

13. The dragline bucket of claim 12, further comprising a second mitered wall connecting the first mitered wall to the rear member.

14. The dragline bucket of claim 13, wherein the bucket is symmetrical about the X-Z plane.

*15. The dragline bucket of claim 1, wherein the first beveled wall forms a first compound angle with the base member and the second beveled wall forms a second compound angle with the base member that is different than the first compound angle such that the first beveled wall and the second beveled wall overhand the base member.*

*16. The dragline bucket of claim 8, further comprising a second beveled wall extending from the rear member to intersect and join together with the first beveled wall, wherein the second beveled wall overhangs the base member.*

*17. The dragline bucket of claim 16, wherein the first beveled wall forms a first angle with the base member and the second beveled wall forms a second angle with the base member that is different than the first angle such that the first beveled wall and the second beveled wall each overhang the base member.*

*18. The dragline bucket of claim 1, wherein the rear member is orthogonal to the X-axis, the dragline bucket further comprising*

*a trunnion attachment wall extending away from the first side member between the first beveled wall and the base member and forming an obtuse angle with the first side member; and*

*a trunnion attachment structure mounted on the trunnion attachment wall, wherein the trunnion attachment structure comprises a base plate; a pad extending from the base plate and defining a trunnion slot with a longitudinal axis that is parallel to the X-axis;*

*a pin aperture extending orthogonally to the trunnion slot; and*

*a pin disposed in the pin aperture.*

*19. The dragline bucket of claim 18, wherein the base plate of the trunnion attachment structure is substantially parallel with the trunnion attachment wall.*

*20. The dragline bucket of claim 8, wherein the rear member is orthogonal to the X-axis, the dragline bucket further comprising*

*a trunnion attachment structure mounted on the first mitered wall, wherein the trunnion attachment structure comprises a base plate; a pad extending from the base plate and defining a trunnion slot with a longitudinal axis that is parallel to the X-axis;*

*a pin aperture extending orthogonally to the trunnion slot; and*

*a pin disposed in the pin aperture.*

*21. The dragline bucket of claim 20, wherein the base plate of the trunnion attachment structure is substantially parallel with the first mitered wall.*

*22. A dragline bucket comprising: a base member extending along an X-axis, a first side member extending from the base member and including a first top edge, a second side member extending from the base member, and a rear member extending from the base member and including a second top edge; wherein the first side member, second side member and base member define a mouth for receiving material into the bucket; a first beveled wall extending from the first side member and a first mitered wall below the first beveled wall and between the first beveled wall and the base member, wherein the first beveled wall overhangs the base member and the first mitered wall angles outward and away from the base member; and a trunnion attachment structure mounted on the first mitered wall.*

*23. The dragline bucket of claim 22, wherein the first mitered wall extends from the first side member towards the rear member and forms an obtuse angle with the first side member.*

*24. The dragline bucket of claim 23, wherein the trunnion attachment structure comprises a base plate; a pad extending from the base plate and defining a trunnion slot with a longitudinal axis that is parallel to the X-axis;*

*pin aperture extending orthogonally to the trunnion slot; and*

*a pin disposed in the pin aperture.*

* * * * *